Patented Oct. 4, 1949

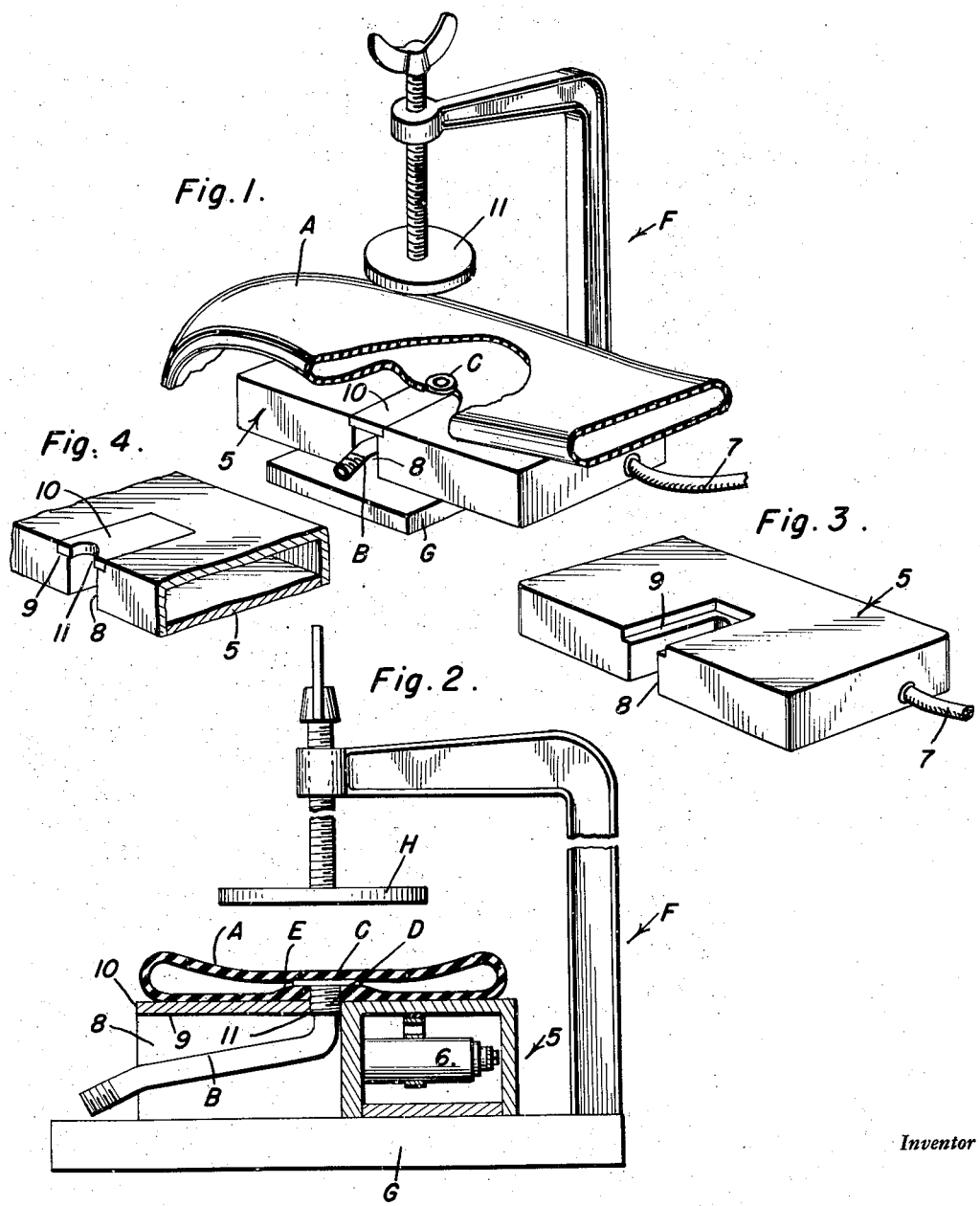

2,483,538

UNITED STATES PATENT OFFICE 2,483,538

TRUCK TUBE REPAIR PLATE

Ben Goodman, Baltimore, Md., assignor to Greenmount Manufacturing Company, Baltimore, Md., a corporation of Maryland Application October 15, 1947, Serial No. 779,968

3 Claims. (Cl. 18—18)

The present invention relates to improvements in a so-called "hot" plate, an electrically heated type, which is used in tire repair establishments for vulcanizing and otherwise repairing heavy-duty truck tubes and the like.

More explicitly, the invention appertains to an electric-type "hot" plate, which is such in construction that it embodies facilities to accommodate a tube with an attached valve stem, making it possible to repair a valve pad on the tube, without difficulty.

It is a matter of common knowledge that the ordinary "hot" plate is a hollow substantially rectangular block-like body, and is provided with internal electrical heating elements. The tube is placed in contact with a heated surface of the hot plate and is clamped to said surface, by the clamping means, for a period sufficiently long to permit the vulcanizing step to be properly taken care of. It is customary in the trade, when repairing an inner tube rupture at the juncture of a valve stem and valve pad, to cut the major portion of the valve stem off at a point quite close to the usual valve pad, thus leaving a screw-threaded stub which projects sufficiently beyond the pad to accommodate a replacement stem, an extra part. Heavy duty truck size valve stems, are of the double-angle and double-bend type and are, as is well known, expensive, and the replacement stem is similarly shaped and is screwed to the stub after the repair has been made. Manifestly, the preceding mode of making repairs is not only time consuming and laborious, but embodies extra expense to perform the job because it is necessary to utilize the aforementioned replacement stem and to dispense with the part of the original stem which is cut off to make way for the replacement stem.

One object of the present invention is to simplify and improve upon the now-followed method of repair, by doing away entirely with the replacement stem needs and, also, obviating the necessity of cutting the original stem when repairing a valve pad, these results being susceptible of accomplishment through the medium of my improved "hot" plate, since the latter is of convertible form and makes it possible to employ it as (1) an ordinary vulcanizing plate and then, by removing a provided slide (2) is permitted to serve as a special valve pad repair plate.

More specifically, I provide a "hot" plate which is practically the same as other "hot" plates used for the same purpose, but which also has, in accordance with this invention, a simple clearance notch opening through an edge portion of the plate which notch is such that it serves to accommodate and seat the angular valve stem on the truck tube, said notch also having a hand inserted and removed slide or cover plate, which may be arranged either to uncover the notch, or to cover it up, whichever is, at the time, required.

Novelty is predicated not only on a valve stem space providing notch in which the valve stem is submerged during the vulcanizing stage of repair but, in addition, on the provision of ledges bordering the side edges and crotch portion of the notch, these serving to seat an accessible and readily insertable and removable plate functioning as a lid or cover for the notch, the inner end of the plate being straight across and fitting tightly into the crotch during one stage and said lid having a valve stem accommodating niche at the opposite end, the idea being that the lid may be inserted as shown in Figure 1 or turned around and inserted as shown in Figure 4.

Other objects, features and advantages will become more readily apparent from the following description and the accompanying illustrative drawings.

In the drawings:

Figure 1 is a perspective view of a "hot" plate constructed in accordance with this invention, showing the same in use on the base of a conventional holding clamp, and also showing a portion of the tube and the manner in which the repair step is attained.

Figure 2 is a view on an enlarged scale, showing the "hot" plate in section.

Figure 3 is a perspective view of the "hot" plate with the lidding slide removed.

Figure 4 is a fragmentary perspective view, based on Figure 3, with the slide in place but with the valve niche of said slide reversed and exposed (compare with Figure 2)

In the drawings, the truck tube is denoted by the reference character A and is conventional, and is provided with a so-called double-angle or equivalent angle-type valve stem B, whose headed portion C and threaded portion D are mounted in the valve pad portion E, as shown in Figures 1 and 2.

Before discussing this phase of the case further, attention is directed to the "hot" plate 5. Generally speaking, "hot" plates, such as are used for vulcanizing valve pads, are of hollow, block-like rectangular form and suitable electrical heating elements 6 are provided on the interior, as shown for instance in Figure 2 of the drawings.

The current is supplied by way of a cable or cord 7. Normally, it will be seen that it would not be possible to place the tube with the valve stem interposed between the "hot" plate and the tube. So, what is commonly done, is to cut off, using a hack saw, the body portion, leaving a threaded stub portion D as close to the valve pad as possible, and to discard the cut-off portion and to make the vulcanization repair. Then, later on and in order to put the repaired tube in shape for use, a replacement stem (not shown) is applied. The replacement portion of the stem is threadedly attached to the cut-off stub of the original or initial valve stem. Naturally, all of this procedure involves an expenditure of time and labor and is needlessly expensive.

I have found that by making provisions in the plate for clearance and pocketing of the valve stem, it is not at all necessary to remove said stem. So, the invention here has to do primarily with the provision in the central and median edge portion of the "hot" plate of a valve stem clearance and temporary pocketing notch 8. The preferred form of notch is as shown in Figure 3, and portions of the plate partly surrounding the notch are counter-recessed to provide ledges 9, for a slide or insert 10. Before further discussing the notch lidding slide or cover, I would call attention to the fact that while the notch might, by some, be construed or interpreted as an aperture, it is, strictly speaking, an elongated notch whose squared crotch portion is situated at the central portion or area of the plate, which opens through top and bottom portions of the plate, and opens also through the outer perimeter edge of said plate and is considerably longer than it is wide. The insert is an imperforate lid which slides into the notch and rests on the ledges provided at 9. Ordinarily, the slide 10 is in the position seen in Figure 4, wherein its upper surface is flush with the main upper surface of the "hot" plate and, therefore, the "hot" plate appears and looks as though it were the usual imperforate plate. It will be noticed, too, that the slide 10 has a straight across end to fit tightly into said crotch and a small niche, a valve embracing niche 11, at its opposite end. This niche is usually disposed outwardly, but when the repair is made, as shown in Figure 2, the slide is turned around and the niche is disposed inwardly, so that it partially embraces the valve stem portion D. Obviously, by taking out the slide from the position seen in Figure 4 and exposing the notch 8, the tube can be laid on the "hot" plate, as shown, and the valve stem, the original angular one, may be simply placed down and thus "sunk" in the clearance and pocketing notch 8. Then, the slide 10 previously taken out, can be replaced with the niche 11 embracing the valve stem portion D, as shown in Figures 1 and 2.

In practice, it is perhaps desirable to use a C-shaped clamp F, having a suitable base G, and a clamping screw H. I am not interested in the type of clamp or the exact construction of the "hot" plate except, and insofar as it is so made, as to permit unhampering clearance for and seating of the valve B. It will be seen that the gist of the invention is, therefore, in the provision of a "hot" plate otherwise ordinary, except for a notch or equivalent clearance pocket 8, and a lid or cover for said pocket, which cover is removable to permit the valve stem to be easily slipped into place and later removed.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. As a new article of manufacture, a hot plate having a median longitudinal edge portion provided with an angular-type valve stem inserting and clearance notch, said notch being open at its outer end and said open outer end opening through the perimeter of said plate and being marginally recessed to provide a slide lid accommodating ledge, and an insertable and removable constantly accessible slide lid fitted into said notch and resting removably on said ledge, said lid being of a width and length corresponding to the width and length of said notch and being accessible for ready insertion and removal, being substantially square at one end to fit snugly into the correspondingly shaped crotch of the notch and having a valve stem adapting niche at its other end.

2. A truck tube repair plate for vulcanizing heavy duty tubes having angular-type valve stems comprising an electrically heated substantially rectangular hot plate with flat top, bottom and marginal surfaces, said hot plate having a notch opening at its outer end through a marginal edge portion of said plate to allow the stated valve stem to be readily placed in position by moving same in a horizontal plane at right angles to the longitudinal axis of the plate, and an insertable and removable lidding slide for the top portion of said notch, said slide being of a width and length corresponding to the width and length of the notch and being flush with the top of said plate, one end of said slide having a valve stem accommodating niche.

3. As a new article of manufacture, a hot plate having a median longitudinal edge portion provided with an angular-type valve stem inserting and clearance notch, said notch being open at its outer end and said open outer end opening through the perimeter of said plate and being marginally recessed to provide a slide lid accommodating ledge, and an insertable and removable constantly accessible slide lid fitted into said notch and resting removably on said ledge, said lid being of a width and length corresponding to the width and length of said notch and being accessible for ready insertion and removal, one end being complementary to the inner end of the notch and the other end being provided with a stem adapting niche.

BEN GOODMAN.

REFERENCES CITED

The following references are of record in the file of this patent:

UNITED STATES PATENTS

| Number | Name | Date |
|---|---|---|
| 1,384,503 | Younger | July 12, 1921 |
| 1,579,490 | Ryan | Apr. 6, 1926 |
| 2,009,549 | Gwynn I | July 30, 1935 |
| 2,086,866 | Gwynn II | July 13, 1937 |
| 2,099,499 | Raney | Nov. 16, 1937 |